US012500147B2

(12) United States Patent
Shatit et al.

(10) Patent No.: US 12,500,147 B2
(45) Date of Patent: Dec. 16, 2025

(54) INTEGRATED CIRCUIT (IC) AND ELECTRONIC APPARATUS

(71) Applicant: Nuvoton Technology Corporation, Hsinchu (TW)

(72) Inventors: Benny Shatit, Hsinchu Science Park (TW); Ming-Che Hung, Hsinchu (TW); Tsung-Hsueh Li, Yunlin County (TW); Uri Trichter, Hsinchu Science Park (TW); Dan Morav, Hsinchu Science Park (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 282 days.

(21) Appl. No.: 17/899,802

(22) Filed: Aug. 31, 2022

(65) Prior Publication Data
US 2023/0076714 A1    Mar. 9, 2023

Related U.S. Application Data

(60) Provisional application No. 63/241,723, filed on Sep. 8, 2021.

(51) Int. Cl.
*G06F 1/14* (2006.01)
*G06F 1/30* (2006.01)
(Continued)

(52) U.S. Cl.
CPC .......... *H01L 23/49513* (2013.01); *G06F 1/14* (2013.01); *G06F 1/30* (2013.01);
(Continued)

(58) Field of Classification Search
CPC ... G06F 1/14; G06F 1/30; G06F 1/182; G06F 1/1677; G06F 21/554; G06F 21/86;
(Continued)

(56) References Cited

U.S. PATENT DOCUMENTS 4,960,982 A * 10/1990 Takahira ............... G07F 7/1008
                                                            235/382
5,363,447 A * 11/1994 Rager .................... H04L 9/0894
                                                            380/273
(Continued)

FOREIGN PATENT DOCUMENTS

| CN | 104850805 B | 3/2019 |
| CN | 108154049 B | 6/2021 |

(Continued)

OTHER PUBLICATIONS

Huang, Yuanwu. CN111143132B "BIOS recovery method, device, equipment and readable storage medium", Filed Dec. 30, 2019, published Jun. 10, 2022. (Year: 2022).*
(Continued)

*Primary Examiner* — Michael Simitoski
(74) *Attorney, Agent, or Firm* — Muncy, Geissler, Olds & Lowe

(57) ABSTRACT

An embodiment of an IC is provided. The IC includes a memory, a controller, an intrusion detector and a memory clear circuit. The memory is configured to store sensitive data. The controller is configured to access the memory. The intrusion detector is configured to detect whether an intrusion event is present in response to an input signal. The memory clear circuit is configured to clear the sensitive data of the memory when the intrusion detector detects the intrusion event.

12 Claims, 3 Drawing Sheets

(51) Int. Cl.
  *G06F 21/55* (2013.01)
  *G06F 21/87* (2013.01)
  *H01L 23/00* (2006.01)
  *H01L 23/31* (2006.01)
  *H01L 23/495* (2006.01)
  *H03K 3/84* (2006.01)

(52) U.S. Cl.
  CPC ............ *G06F 21/554* (2013.01); *G06F 21/87* (2013.01); *H01L 23/3107* (2013.01); *H01L 24/29* (2013.01); *H01L 24/32* (2013.01); *H01L 24/48* (2013.01); *H01L 24/73* (2013.01); *H03K 3/84* (2013.01); *G06F 2221/034* (2013.01); *H01L 24/45* (2013.01); *H01L 2224/2919* (2013.01); *H01L 2224/32245* (2013.01); *H01L 2224/45144* (2013.01); *H01L 2224/48091* (2013.01); *H01L 2224/48247* (2013.01); *H01L 2224/48463* (2013.01); *H01L 2224/73265* (2013.01); *H01L 2924/0665* (2013.01)

(58) Field of Classification Search
  CPC ............... G06F 21/87; G06F 2221/034; G06F 2221/2143; H01L 2224/2919; H01L 2224/32245; H01L 2224/45144; H01L 2224/48091; H01L 2224/48247; H01L 2224/48463; H01L 2224/73265; H01L 23/3107; H01L 23/49513; H01L 24/29; H01L 24/32; H01L 24/45; H01L 24/48; H01L 24/73; H01L 2924/0665; H05K 1/0275; H03K 3/84; G06K 19/07372; G08B 29/046; G07D 11/225
  See application file for complete search history.

(56) References Cited

U.S. PATENT DOCUMENTS

| | | | | |
|---|---|---|---|---|
| 5,689,243 A * | 11/1997 | Bianco | G06F 21/552 | 713/168 |
| 6,218,941 B1 * | 4/2001 | Cromer | G06F 21/87 | 340/568.4 |
| 6,357,007 B1 * | 3/2002 | Cromer | H04L 63/10 | 713/192 |
| 8,190,666 B2 * | 5/2012 | Suzuki | B60R 25/20 | 708/250 |
| 8,321,773 B1 * | 11/2012 | Pedersen | G06F 21/86 | 714/790 |
| 8,359,660 B2 * | 1/2013 | Lang | G06F 21/79 | 726/34 |
| 8,375,225 B1 * | 2/2013 | Ybarra | G06F 21/85 | 713/153 |
| 9,578,763 B1 * | 2/2017 | Wade | H05K 5/0086 | |
| 9,813,242 B2 * | 11/2017 | Bar | G06F 21/50 | |
| 9,948,615 B1 * | 4/2018 | Davis | H04L 63/0428 | |
| 10,127,409 B1 * | 11/2018 | Wade | G06F 21/75 | |
| 10,831,912 B2 | 11/2020 | Karn | | |
| 11,487,441 B2 * | 11/2022 | Chang | G06F 21/79 | |
| 2002/0131592 A1 * | 9/2002 | Hinnant | H04L 9/0662 | 380/46 |
| 2004/0066274 A1 * | 4/2004 | Bailey | G06F 21/554 | 340/5.6 |
| 2007/0086257 A1 * | 4/2007 | Bernier | G06F 21/554 | 340/568.1 |
| 2007/0294497 A1 * | 12/2007 | Chen | G06F 12/1466 | 711/164 |
| 2008/0001594 A1 * | 1/2008 | Youssef | G01R 22/066 | 324/110 |
| 2008/0028168 A1 * | 1/2008 | Muraoka | G06F 21/86 | 711/E12.098 |
| 2009/0195394 A1 * | 8/2009 | Johnson | H04M 1/18 | 340/584 |
| 2010/0198558 A1 * | 8/2010 | Genna | G06F 21/725 | 702/187 |
| 2010/0235833 A1 * | 9/2010 | Huang | G06F 21/575 | 710/36 |
| 2012/0185636 A1 * | 7/2012 | Leon | H01L 23/576 | 711/E12.001 |
| 2012/0203441 A1 * | 8/2012 | Higgins | G07C 5/008 | 701/102 |
| 2013/0043929 A1 * | 2/2013 | Chen | G06F 1/263 | 327/535 |
| 2013/0205139 A1 * | 8/2013 | Walrath | H04L 9/16 | 713/190 |
| 2014/0195724 A1 * | 7/2014 | Shin | G06F 12/1408 | 711/202 |
| 2014/0283146 A1 * | 9/2014 | Obukhov | G06F 21/87 | 726/34 |
| 2015/0130636 A1 * | 5/2015 | Bowling | H04Q 9/00 | 340/870.09 |
| 2016/0026829 A1 * | 1/2016 | Brocker | G06F 21/87 | 726/34 |
| 2017/0171754 A1 * | 6/2017 | South | H04W 12/06 | |
| 2019/0004717 A1 * | 1/2019 | Voigt | G06F 21/554 | |
| 2020/0089921 A1 * | 3/2020 | Karakoyunlu | H04L 9/0866 | |
| 2020/0139932 A1 * | 5/2020 | Wood | H04L 9/3247 | |
| 2021/0073426 A1 * | 3/2021 | Eriksson | G06F 21/86 | |
| 2021/0117518 A1 * | 4/2021 | Hughes | G06Q 30/0185 | |
| 2021/0298122 A1 * | 9/2021 | Kukowski | H04L 63/083 | |
| 2021/0342065 A1 * | 11/2021 | Chang | G06F 21/86 | |
| 2021/0350017 A1 * | 11/2021 | Gordon | G06F 21/602 | |

FOREIGN PATENT DOCUMENTS

| | | | | |
|---|---|---|---|---|
| EP | 558222 A1 * | 9/1993 | ............ G06F 21/86 |
| TW | I655558 B | 4/2019 | |
| TW | 202131209 A | 8/2021 | |

OTHER PUBLICATIONS

Huang, Yuanwu. CN111143132B "BIOS recovery method, device, equipment and readable storage medium" (machine translation), Filed Dec. 30, 2019, published Jun. 10, 2022. (Year: 2022).*

* cited by examiner

INTEGRATED CIRCUIT (IC) AND ELECTRONIC APPARATUS

CROSS REFERENCE TO RELATED APPLICATIONS

This Application claims priority of U.S. Provisional Application No. 63/241,723, filed on Sep. 8, 2021, the entirety of which is incorporated by reference herein.

BACKGROUND OF THE INVENTION

Field of the Invention

The invention relates to an integrated circuit (IC), and more particularly to a real time clock (RTC) IC.

Description of the Related Art

In recent years, various electronic apparatuses may include an embedded real time clock (RTC) in association with functions such as sensor sampling and management, metering, Internet of Things (IoT), and so on.

The RTC is capable of outputting the actual time like a clock. Generally, an RTC can be used in an electronic apparatus or a system that needs accurate time, such as a personal computer, a server, a storage system, or an embedded system. When an electronic apparatus is powered on, the processor of the electronic apparatus may read the time from the RTC and use that as the system time in the electronic apparatus. However, an intruder can easily modify the system time of an electronic apparatus by modifying the time of the RTC, so as to sidestep the terms of the protection of data, which puts the security of the data in the electronic apparatus at risk. Therefore, it is importation to detect any such intrusion events.

BRIEF SUMMARY OF THE INVENTION

An integrated circuit (IC) and an electronic apparatus are provided. An embodiment of an IC is provided. The IC includes a memory, a controller, an intrusion detector, and a memory clear circuit. The memory is configured to store sensitive data. The controller is configured to access the memory. The intrusion detector is configured to detect whether an intrusion event is present in response to an input signal. The memory clear circuit is configured to clear the sensitive data of the memory when the intrusion detector detects the intrusion event.

Moreover, an embodiment of an electronic apparatus is provided. The electronic apparatus includes a chassis, a chassis open detection switch, a host device, and an integrated circuit (IC). The chassis open detection switch is disposed to contact the chassis. The IC is configured to detect whether the chassis has been opened in response to an input signal from the chassis open detection switch. The IC includes a memory, a controller, an intrusion detector and a memory clear circuit. The memory is configured to store sensitive data. The controller is coupled to the host device through a first bus. The intrusion detector is coupled to the chassis open detection switch. The intrusion detector is configured to detect whether an intrusion event is present in response to the input signal from the chassis open detection switch. The memory clear circuit is configured to clear the sensitive data of the memory when the intrusion detector detects the intrusion event.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
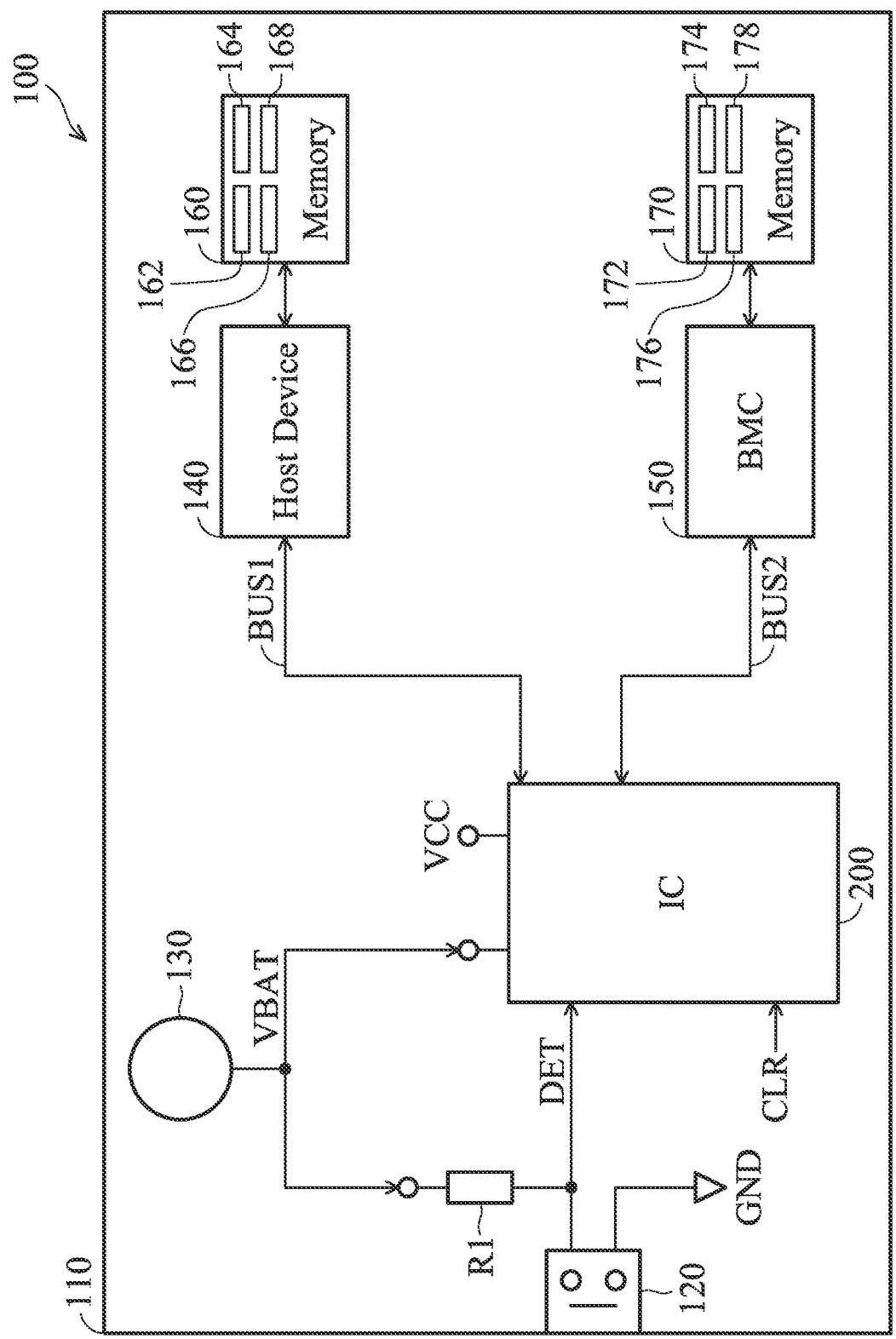
FIG. 1 shows a schematic illustrating an electronic apparatus according to some embodiments of the invention.

FIG. 1 shows a schematic illustrating an electronic apparatus 100 according to some embodiments of the invention. The electronic apparatus 100 has a chassis 110. The electronic apparatus 100 includes a chassis open detection switch 120, an IC 200, a coin battery 130, a host device (or a host processor) 140, a baseboard management controller (BMC) 150, the memories 160 and 170, and a resistor R1. In some embodiments, the chassis open detection switch 120, the IC 200, the coin battery 130, the host device 140, the BMC 150, and the memories 160 and 170 and the resistor R1 are disposed in one or more printed circuit boards (PCBs) inside the chassis 110.

It should be noted that, in order to clarify the concept of the invention, FIG. 1 is a simplified block diagram in which only the elements relevant to the invention are shown. However, the invention should not be limited to what is shown in FIG. 1.

The coin battery 130 is configured to provide a battery voltage VBAT that serves as the first power supply voltage to the IC 200. The resistor R1 is a pull-up resistor. The resistor R1 has a first terminal coupled to the coin battery 130 and a second terminal coupled to the chassis open detection switch 120 and the IC 200.

The chassis open detection switch 120 is disposed to contact the chassis 110. The chassis open detection switch 120 is coupled between the resistor R1 and a ground GND. When the chassis 110 is not opened, the chassis open detection switch 120 is turned off, and a detection signal DET of the chassis open detection switch 120 is pulled to a high voltage level corresponding to the battery voltage VBAT through the resistor R1. Conversely, when the chassis 110 is opened, the chassis open detection switch 120 is turned on, and the detection signal DET is pulled to a low voltage level corresponding to the ground GND through the chassis open detection switch 120. In other words, when the chassis 110 is opened, the detection signal DET has a low voltage level, which indicates that there is a chassis intrusion event in the electronic apparatus 100.

The IC 200 is powered by the battery voltage VBAT or a power supply voltage VCC. The power supply voltage VCC serves as the second power supply voltage to the IC 200, and the power supply voltage VCC is provided by a power generator (not shown) of the electronic apparatus 100 when the electronic apparatus 100 is powered on. Therefore, when the electronic apparatus 100 is powered on, the IC 200 is powered by the power supply voltage VCC. Conversely, when the electronic apparatus 100 is powered off, the IC 200 is powered by the battery voltage VBAT because the power generator is disabled and no power supply voltage VCC is provided. In some embodiments, the battery voltage VBAT and the power supply voltage VCC have different voltage levels.

The IC 200 is configured to communicate with the host device 140 through a first bus BUS1 and with the BMC 150 through a second bus BUS2. The first bus BUS1 and the second bus BUS2 are inter-integrated circuit (I2C) buses. Each of the first bus BUS1 and the second bus BUS2 has a serial data (SDA) line and a serial clock (SCL) line; the SDA line is a bidirectional line, and the SCL line is an unidirectional line. The memory 160 and the memory 170 are dedicated memories of the host device 140 and the BMC 150, respectively. In some embodiments, the memory 160 and the memory 170 are non-volatile memories, e.g., flash memories.

Figure 2:
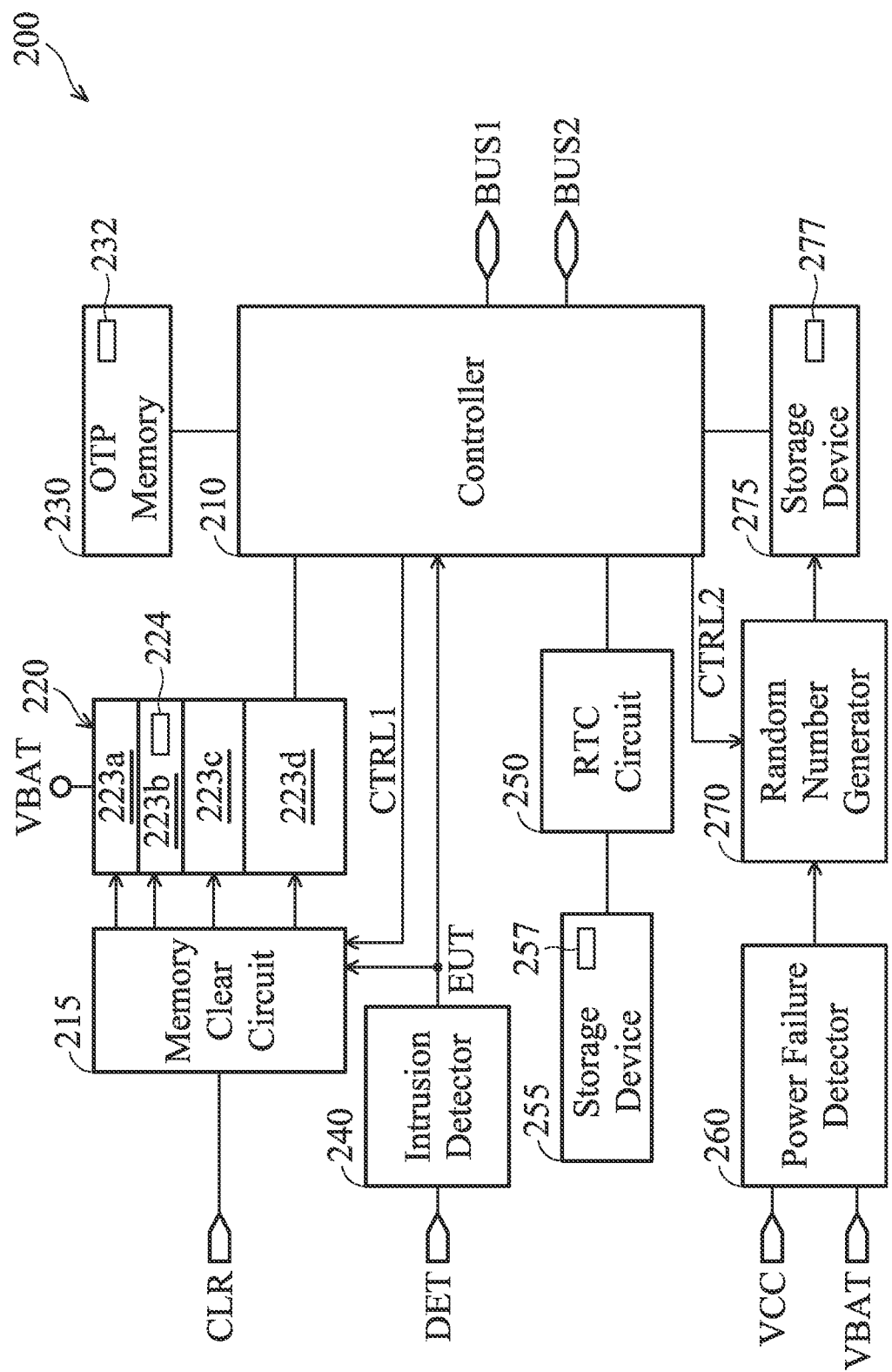
FIG. 2 shows a schematic illustrating the IC of FIG. 1 according to some embodiments of the invention.

FIG. 2 shows a schematic illustrating the IC 200 of FIG. 1 according to some embodiments of the invention. The IC 200 includes a controller 210, a memory clear circuit 215, a memory 220, a one-time programmable (OTP) memory 230, an intrusion detector 240, a real time clock (RTC) circuit 250, a storage device 255, a power failure detector 260, a random number generator 270, and a storage device 275. In some embodiments, the storage device 255 and the storage device 275 are implemented in the same storage device.

It should be noted that, in order to clarify the concept of the invention, FIG. 2 is a simplified block diagram in which only the elements relevant to the invention are shown. However, the invention should not be limited to what is shown in FIG. 2. Furthermore, the pins configured to connect the other external devices are omitted in FIG. 2.

The controller 210 is configured to communicate with the host device 140 through the first bus BUS1 and with the BMC 150 through the second bus BUS2. In other words, the host device 140 is capable of accessing information e.g., time, date and memory context) of the IC 200 through the first bus BUS1, and the BMC 150 is capable of accessing information of the IC 200 through the second bus BUS2.

In FIG. 2, the memory 220 is a SRAM accessed by the controller 210. The memory 220 is divided into a plurality of memory ranges (or memory banks) 223a through 223d. In some embodiments, the memory ranges 223a through 223d have the same size. In some embodiments, the memory ranges 223a through 223d have different sizes. In this embodiment, the memory ranges 223a and 223b have the same size, and the memory ranges 223b through 223d have different sizes. For example, the size of the memory range 223c is greater than the size of the memory range 223b, and the size of the memory range 223d is greater than the size of the memory range 223c. Furthermore, in the memory 220, one or some memory ranges are used to store validation codes 224, such as the identification (ID) code for the IC 200. In some embodiments, the validation codes 224 are provided (or written, programmed) by the host device 140 through the first bus BUS1 according to the validation codes 162 stored in the memory 160. In some embodiments, the validation codes 244 are provided by the BMC 150 through the second bus BUS2 according to the validation codes 172 stored in the memory 170. In this embodiment, the validation code 224 is stored in the memory range 223b.

The memory clear circuit 215 is configured to perform clear functions for the memory ranges 223a through 223d according to a clear signal CLR, a control signal CTRL1 and an event signal EUT, so as to respectively clear the data in the memory ranges 223a through 223d. In some embodiments, the clear signal CLR is provided by the other device in the electronic apparatus 100. In some embodiments, the clear signal CLR is provided through a pull-up device that is tied to a power supply (e.g., the battery voltage VBAT). In some embodiments, the clear signal CLR is provided through a pull-down device that is tied to a ground GND. The control signal CTRL1 is provided by the controller 210. The controller 210 is configured to provide the control signal CTRL1 to the memory clear circuit 215, so as to assign which memory range of the memory 220 should be cleared in which respective state. For example, the controller 210 provides the control signal CTRL1 to the memory clear circuit 215 to indicate that the memory range 223b storing the verification codes 224 should be cleared (i.e., the verification codes 224 should be cleared/deleted) when a chassis intrusion event takes place in the electronic apparatus 100. In some embodiments, the control signal CTRL1 is omitted because whether to enable the clear functions of respective memory ranges is pre-set (or pre-assigned) in the memory clear circuit 215. It should be noted that the verification code 224 is only an example, and is not intended to limit the invention. The verification code 224 may be any type of sensitive data.

The intrusion detector 240 is configured to detect the detection signal DET of the chassis open detection switch 120, and provide the event signal EUT to the memory clear circuit 215 and the controller 210 when detecting that the chassis intrusion event is present according to the detection signal DET. When the chassis open detection switch 120 is turned on, the detection signal DET is pulled to a low voltage level. When the intrusion detector 240 detects that there has been a chassis intrusion event (i.e., the chassis intrusion event is present) according to the detection signal DET having a low voltage level, the intrusion detector 240 is configured to provide the event signal EUT to notify the memory clear circuit 215 and the controller 210. Therefore, once the event signal EUT indicates that chassis intrusion event is present, the memory clear circuit 215 is configured to clear the memory ranges of the memory 220 that should be cleared during a chassis intrusion event, according to the settings of the control signal CTRL1, i.e., the memory ranges used to store the validation codes.

When the electronic apparatus 100 is powered on, the host device 140 (or the BMC 150) is configured to access the memory 220 of the IC 200, so as to verify the validation codes 224 stored in specific memory range 223b of the memory 220. In other words, each time the electronic apparatus 100 is turned on, the data of the specific memory range 223b will be verified with the validation codes 162 stored in the memory 160 (or the validation codes 172 stored in the memory 170). If the specific memory range 223b is cleared, the validation codes 224 stored in the specific memory range 223b disappear, i.e., the data of the specific memory range 223b is different from the validation codes 162 stored in the memory 160 (or the validation codes 172 stored in the memory 170). Based on mismatched validation codes, the host device 140 (or the BMC 150) is configured to determine that the chassis 110 has been opened (i.e., a chassis intrusion event is present), and data and the system time/date stored in the IC 200 may be entrusted, and then the host device 140 or the BMC 150 is configured to launch the intrusion alarm/protection operations and re-program the system time and date into the IC 200. The chassis intrusion event indicates the chassis has been opened, for example, the chassis is currently opened or the chassis was once opened (i.e., the chassis is currently closed).

The RTC circuit 250 is configured to provide the system time and date based on the clock signal from the oscillator (not shown). Furthermore, during manufacturing, or after production (when the chassis 110 is closed), the host device 140 or the BMC 150 is configured to program the system time and date into the RTC circuit 250 through the controller 210.

When the intrusion detector 240 detects that there has been a chassis intrusion event (i.e., the chassis intrusion event is present) according to the detection signal DET having a low voltage level, the controller 210 is configured to control the RTC circuit 250 to store the timestamp value 257 of the chassis intrusion in the storage device 255, and the timestamp value 257 includes the actual time, i.e., the time at which the chassis intrusion was recorded in the storage device 255. In some embodiments, the storage device 255 is a read-only register. Furthermore, the controller 210 is further configured to provide the timestamp value 257 to the host device 140 and the BMC 150 in response to requests from the host device 140 and the BMC 150. Thus, after receiving the timestamp value 257, the host device 140 is configured to store the timestamp value 257 in the memory 160 as the last-event timestamp 166, and the BMC 150 is configured to store the timestamp value 257 in the memory 170 as the last-event timestamp 176.

In some embodiments, when the electronic apparatus 100 is powered on, the host device 140 (or the BMC 150) is configured to read the timestamp value 257 from the IC 200 and read the last-event timestamp 166 from the memory 160 (or the last-event timestamp 176 from the memory 170), so as to compare the timestamp value 257 and the last-event timestamp 166 (or the last-event timestamp 176). If the timestamp value 257 is equal to the last-event timestamp 166 or 176, the host device 140 or the BMC 150 determines that there is no chassis intrusion event currently taking place, i.e., the chassis 110 has not been opened (the chassis intrusion event is absent). If the timestamp value 257 is different from the last-event timestamp 166 or 176, the host device 140 or the BMC 150 determines that there has been a chassis intrusion event, i.e., the chassis 110 has been opened, and then obtains the intrusion time according to the timestamp value. Furthermore, the host device 140 or the BMC 150 further determines that the system time/date provided by the RTC circuit 250 may be untrustworthy, the system time and date have been tampered with. Furthermore, the host device 140 is configured to update the last-event timestamp 166 of the memory 160 according to the timestamp value 257 stored in the storage device 255. Similarly, the BMC 150 is configured to update the last-event timestamp 176 of the memory 170 according to the timestamp value 257 stored in the storage device 255.

The controller 210 may be a bus arbiter for the host device 140 and the BMC 150. In some embodiments, when detecting the chassis intrusion, the controller 210 is configured to stop responding to the host device 140 and the BMC 150. For example, when the event signal EUT indicates that a chassis intrusion event is present, the controller 210 is configured to ignore time and memory access requests from the host device 140 through the first bus BUS1 and from the BMC 150 through the second bus BUS2. Thus, the host device 140 and the BMC 150 cannot obtain the system time and date from the IC 200. If the IC 200 does not respond the time and memory access requests (i.e., no system time and date are obtained by the host device 140 and the BMC 150), the host device 140 and the BMC 150 can determine that the chassis 110 has been opened (i.e., the chassis intrusion event is present). Next, the host device 140 (or the BMC 150) is configured to provide the administrator root key 164 stored in the memory 160 (or administrator root key 174 stored in the memory 1701 to the IC 200. After obtaining the administrator root key 164 (or the administrator root key 174), the controller 210 is configured to compare the administrator root key 164 (or the administrator root key 174) with a secure key 232 of the OTP memory 230. It should be noted that the secure key 232 is programed in the OTP memory 230 during manufacturing the IC 200. When the administrator root key 164 (or the administrator root key 174) matches the secure key 232 of the OTP memory 230, the controller 210 is configured to start responding to the time and memory access requests from the host device 140 and the BMC 150.

When someone opens the chassis 110 (may be system maintenance or malicious intrusion), the IC 200 is configured to determine that chassis intrusion event is present in response to the detect signal DET. Thus, the controller 210 is configured to control the IC 200 to stop responding to the time and memory access requests from the first bus BUS1 and the second bus BUS2. Therefore, the attacker has no chance to steal or tamper with the content of the memory 220, the OTP memory 230 and the storage device 255 and 275 and the time and date of the RTC circuit 250 unless system owner inputs the administrator root key 164 through the first bus BUS1 or the administrator root key 174 through the second bus BUS2. In other words, when the intrusion detector 240 detects that the intrusion event is present, the controller 210 is configured to ignore the time and memory access requests and not output the time and date to the first bus BUS1 and second bus BUS2 until an input root key (e.g., the administrator root key 164 or the administrator root key 174) from the host device 140 or the BMC 150 matches the secure key 232 of the OTP memory 230.

The power failure detector 260 is configured to detect whether the battery voltage VBAT and/or the power supply voltage VCC have resumed. In some embodiments, when the power failure detector 260 detects that only the power supply voltage VCC has resumed, the power failure detector 260 is configured to control the random number generator 270 to generate (or update) a random value (i.e., a nonce) 277 and to store it in the storage device 275. In some embodiments, when the power failure detector 260 detects that both the power supply voltage VCC and the battery voltage VBAT have resumed, the power failure detector 260 is configured to control the random number generator 270 to generate a random value 277 and to store it in the storage device 275. In some embodiments, the storage device 275 is a read-only register.

Figure 3:
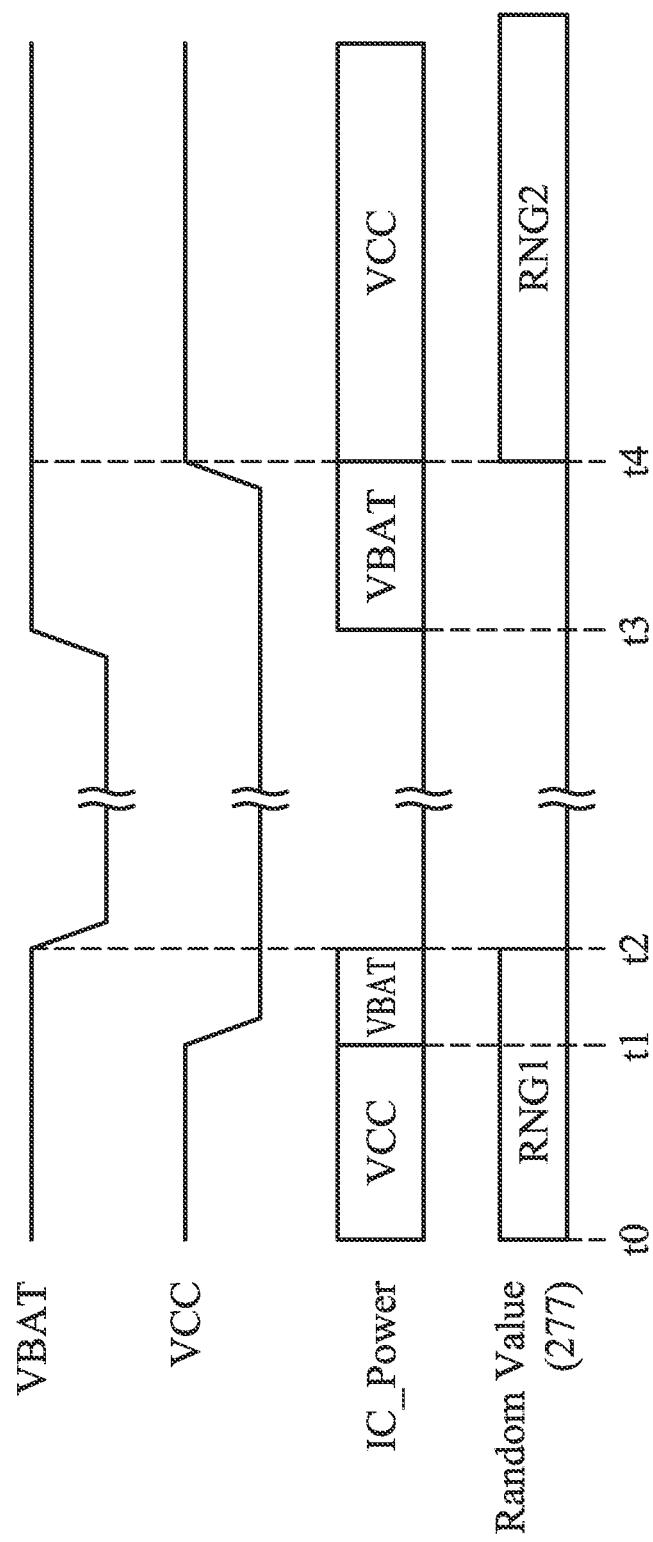
FIG. 3 shows a waveform illustrating the relationship between a power voltage IC_Power of the IC and the random value according to some embodiments of the invention.

FIG. 3 shows a waveform illustrating the relationship between a power voltage IC_Power of the IC 200 and the random value 277 according to some embodiments of the invention. As described above, when the electronic apparatus 100 is powered on, the IC 200 is powered by the power supply voltage VCC, and the power voltage IC_Power of the IC 200 is generated according to the power supply voltage VCC, as shown from time t0 to time t1. When the electronic apparatus 100 is powered off, the IC 200 is powered by the battery voltage VBAT, and the power voltage IC_Power is generated according to the battery voltage VBAT, as shown from time t1 to time t2. Moreover, the random value 275 is RNG1 from the time t0 to time t2. In some embodiments, the random value 275 is a digital value with multiple bits (e.g., 64 bits). It should be noted that bigger bit number of the random value 275 increases the difficulty of malicious attacks.

In FIG. 3, the coin battery 130 is removed at time t2 and then is reinstalled at time t3. Therefore, no power voltage IC_Power is generated from time t2 to time t3. Next, the power voltage IC_Power is generated according to the battery voltage VBAT from time t3 to time t4. Next, the electronic apparatus 100 is powered on and the power voltage IC_Power is generated according to the power supply voltage VCC after time t4. Simultaneously, the power failure detector 260 detects that both the power supply voltage VCC and the battery voltage VBAT have resumed, and then controls the random number generator 270 to generate a new random value 277 (i.e., RNG2 that is different from RNG1) and store the new random value 277 into the storage device 275. It should be noted that the random value 277 is unpredictable for the IC 200.

From time t2 to time t3, a malicious manipulation (e.g., the memory, time or date of the IC 200 is re-programed by the attacker) or a physical attack (e.g. the IC 200 is replaced by the attacker) may occur. By self-updating the random value 277 during certain conditions, the electronic apparatus 100 is capable of identifying malicious works attacker done.

Referring back o FIG. 2, in some embodiments, when the event signal EUT indicates that a chassis intrusion event is present, the controller 210 is configured to provide a control signal CTRL2 to the random number generator 270, so as to control the random number generator 270 to generate (or update) the random value 277 and to store it in the storage device 275.

In some embodiments, in response to an instruction from the host device 140 (or the BMC 150), the controller 210 is configured to provide the control signal CTRL2 to the random number generator 270, so as to control the random number generator 270 to generate (or update) a new random value 277 and to store it in the storage device 275.

Every time the electronic apparatus 100 is powered on, the host device 140 (or the BMC 150) is configured to read the random value 277 from the storage device 275 and the previous random value 168 from the memory 160 (or the previous random value 178 from the memory 170), so as to compare the random value 277 and the previous random value 168 (or the previous random value 178). If the random value 277 is equal to the previous random value 168 or the previous random value 178, the host device 140 or the BMC 150 determines that there is no chassis intrusion event currently taking place, i.e., the chassis 110 has not been opened (the chassis intrusion event is absent). If the random value 277 is different from the previous random value 168 or 178 (e.g., RNG2 (i.e., the random value 277 of the IC 200) is different from RNG1 (i.e., the previous random value 168 stored in the memory 160 from the time t0 to time t2) in FIG. 3), the host device 140 or the BMC 150 determines that there has been a chassis intrusion event, i.e., the chassis 110 has been opened. Furthermore, the host device 140 or the BMC 150 further determines that the system time/date provided by the RTC circuit 250 may be untrustworthy, i.e., the system time and date have been tampered with.

Based on mismatched random values, the host device 140 (or the BMC 150) is configured to determine that the chassis 110 has been opened, and data and the system time/date stored in the IC 200 may be untrusted, and then the host device 140 or the BMC 150 is configured to launch the intrusion alarm protection operations and re-program the system time and date into the IC 200. Furthermore, the host device 140 is configured to update the previous random value 168 of the memory 160 according to the random value 277 stored in the storage device 275. Similarly, the BMC 150 is configured to update the previous random value 178 of the memory 170 according to the random value 277 stored in the storage device 275.

According to the detection signal DET, the IC 200 is configured to detect whether there has been a chassis intrusion event. When there has been a chassis intrusion event, the IC 200 is configured to store the timestamp value 257 corresponding to the chassis intrusion event, update the random value 277, clear the specific memory range (or memory bank), or lock (block) the first bus BUS1 and the second bus BUS2 to access, so that the host device 140 and the BMC 150 can know that a chassis intrusion event is present (i.e., the chassis 110 has been opened). Furthermore, the data of the specific memory range are cleared or hide, thereby protecting critical data in the IC 200 from being stolen by the attackers. Furthermore, after locking the first bus BUS1 and the second bus BUS2 (e.g., the memory 220 cannot be accessed through the first bus BUS1 and the second bus BUS2), the attackers cannot read, modify or delete the memory contents in the IC 200.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit (IC), comprising:
   a memory configured to store sensitive data;
   a controller configured to access the memory;
   an intrusion detector configured to detect whether an intrusion event is present in response to an input signal;
   a real time clock (RTC) circuit configured to provide time and date;
   a one-time programmable (OTP) memory configured to store a secure key,
   wherein when the intrusion detector detects the intrusion event, the controller is configured to not output the time and date to an external device until an input root key from the external device matches the secure key of the OTP memory;
   a first storage device configured to store a timestamp value comprising actual time that the intrusion detector detects the intrusion event,
   a memory clear circuit configured to clear the sensitive data of the memory when the intrusion detector detects the intrusion event;
   a random number generator configured to generate a random value when the intrusion detector detects the intrusion event; and
   a second storage device configured to store the random value,
   wherein in response to an instruction from the external device, the controller is configured to provide the random value stored in the second storage device to the external device.

2. The IC as claimed in claim 1, wherein the intrusion detector is electrically connected to a chassis open detection switch of an electronic apparatus.

3. The IC as claimed in claim 1, wherein the external device is configured to determine whether the random value has changed, and to determine that the intrusion event has occurred when determining that the random value has changed.

4. The IC as claimed in claim 1, further comprising:
a power failure detector configured to detect whether a battery voltage and a power supply voltage have resumed,
wherein the random number generator is further configured to generate the random value when the power failure detector detects that the battery voltage or the power supply voltage resumes.

5. An electronic apparatus, comprising:
a chassis;
a chassis open detection switch disposed to contact the chassis;
a host device; and
an integrated circuit (IC) configured to detect whether the chassis has been opened in response to an input signal from the chassis open detection switch, and comprising:
a first memory configured to store sensitive data;
a controller coupled to the host device through a first bus;
an intrusion detector coupled to the chassis open detection switch, and configured to detect whether an intrusion event is present in response to the input signal from the chassis open detection switch;
a one-time programmable (OTP) memory configured to store a secure key,
wherein when the intrusion detector detects the intrusion event, the controller is configured to not output the time and date to the host device through the first bus until the controller of the IC obtains a root key from the host device through the first bus and the root key matches the secure key of the OTP memory;
a first storage device configured to store a timestamp value comprising actual time that the IC detects that the chassis has been opened,
a memory clear circuit configured to clear the sensitive data of the first memory when the intrusion detector detects the intrusion event;
a random number generator configured to generate a random value when the intrusion detector detects the intrusion event; and
a second storage device configured to store the random value, wherein the host device is configured to obtain the random value stored in the second storage device of the IC through the first bus, and to determine whether the intrusion event is present according to the random value.

6. The electronic apparatus as claimed in claim 5, wherein the host device is configured to access the first memory of the IC, and the sensitive data is stored in one of memory ranges of the first memory, wherein when the host device accesses the first memory and detects that the one of the first memory ranges of the first memory has been cleared, the host device is configured to determine that the intrusion event is present.

7. The electronic apparatus as claimed in claim 5, wherein the host device is configured to compare the random value with a previous random value, and to determine that the intrusion event has ever occurred when the random value is different from the previous random value.

8. The electronic apparatus as claimed in claim 5, wherein the IC further comprises:
a power failure detector configured to detect whether a battery voltage and a second power supply voltage have resumed;
a coin battery configured to provide the battery voltage; and
a power generator configured to provide the power supply voltage,
wherein the random number generator is further configured to generate the random value when the power failure detector detects that the battery voltage or the power supply voltage resumes.

9. The electronic apparatus as claimed in claim 8, wherein when the electronic apparatus is powered down, the power generator is disabled and the power supply voltage is not provided.

10. The electronic apparatus as claimed in claim 8, further comprising:
a resistor configured to have a first end coupled to the coin battery and a second end coupled to the intrusion detector.

11. An electronic apparatus, comprising:
a chassis;
a chassis open detection switch disposed to contact the chassis;
a host device; and
an integrated circuit (IC) configured to detect whether the chassis has been opened in response to an input signal from the chassis open detection switch, and comprising:
a first memory configured to store sensitive data;
a controller coupled to the host device through a first bus;
an intrusion detector coupled to the chassis open detection switch, and configured to detect whether an intrusion event is present in response to the input signal from the chassis open detection switch;
a one-time programmable (OTP) memory configured to store a secure key,
wherein when the intrusion detector detects the intrusion event, the controller is configured to not output the time and date to the host device through the first bus until the controller of the IC obtains a root key from the host device through the first bus and the root key matches the secure key of the OTP memory;
a first storage device configured to store a timestamp value comprising actual time that the IC detects that the chassis has been opened;
a memory clear circuit configured to clear the sensitive data of the first memory when the intrusion detector detects the intrusion event;
wherein the IC further comprises:
a random number generator configured to generate a random value when the intrusion detector detects the intrusion event; and
a second storage device configured to store the random value;
wherein the electronic apparatus further comprises:
a baseboard management controller (BMC) coupled to the IC through a second bus,
wherein the BMC is configured to obtain the random value stored in the second storage device of the IC through the second bus, and to determine whether the intrusion event is present according to the random value.

12. The electronic apparatus as claimed in claim 11, wherein the first and second buses are inter-integrated circuit (I2C) buses.

* * * * *